(12) United States Patent
Ngo-Beelman et al.

(10) Patent No.: US 6,311,475 B1
(45) Date of Patent: Nov. 6, 2001

(54) DEVICE FOR IGNITING A COMBUSTION IN A COMBUSTION CHAMBER OF A GAS TURBINE

(75) Inventors: Ung-Lap Ngo-Beelman, Karlsruhe; Mark Renner, Mannheim; Jens Schlundt, Ilvesheim; Gerolf Heintz, Biebesheim; Mario Leonhard, Heppenheim; Ludwig Wahlig, Bürstadt; Klaus Behnke, Schriesheim; Michael Witt, Mannheim, all of (DE); Christian Bohtz, Geroldswil (CH); Jens Molsen, Mannheim (DE); Reinhold Schmidt, Waldshut-Tiengen (DE)

(73) Assignee: ABB Patent GmbH, Mannheim (GB)

( * ) Notice: Subject to any disclaimer, the term of this patent is extended or adjusted under 35 U.S.C. 154(b) by 0 days.

(21) Appl. No.: 09/583,788

(22) Filed: May 31, 2000

(51) Int. Cl.$^7$ .................................................. F02C 7/266
(52) U.S. Cl. ........................................ 60/39.827; 431/264
(58) Field of Search ............................ 60/39.821, 39.827; 431/265, 266, 264

(56) References Cited

U.S. PATENT DOCUMENTS

| 2,937,296 | * | 5/1960 | Logan ................................ 60/39.827 |
| 3,319,130 | * | 5/1967 | Betteridge ......................... 60/39.827 |
| 5,491,972 | * | 2/1996 | Bretz et al. ....................... 60/39.821 |

* cited by examiner

Primary Examiner—Charles G. Freay
(74) Attorney, Agent, or Firm—Herbert L. Lerner; Laurence A. Greenberg; Werner H. Stemer

(57) ABSTRACT

A device for igniting a combustion in a combustion chamber of a gas turbine has a housing fitted with an end piece and with a head piece. Hitherto, an ignition conductor comes into contact with combustion air. Moreover, fragments of a partial ceramic insulation can lead to damage. To improve the quality of ignition, the ignition conductor and a gas conduit are disposed to run parallel to one another within a housing. The ignition conductor is surrounded by a protective sleeve, and an annular space between the ignition conductor and the protective sleeve is filled completely with a ceramic material. An annular disc serving as an ignition electrode is mounted on that end of the protective sleeve that projects into the head piece.

5 Claims, 1 Drawing Sheet

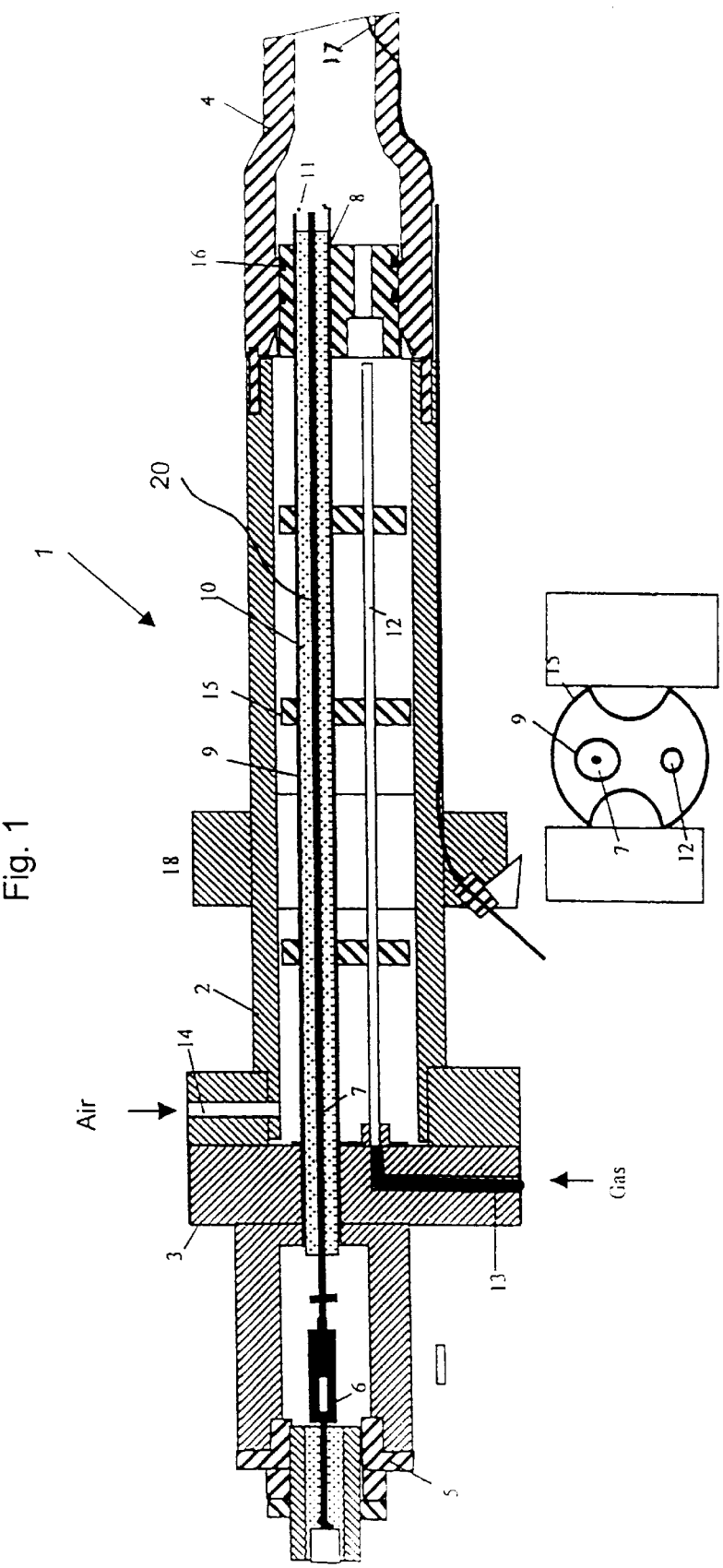

DEVICE FOR IGNITING A COMBUSTION IN A COMBUSTION CHAMBER OF A GAS TURBINE

BACKGROUND OF THE INVENTION

FIELD OF THE INVENTION

The invention relates to a device for igniting a combustion in a combustion chamber of a gas turbine. The device has a housing with an end piece and a head piece. An ignition conductor extends between the end piece and the head piece. A spark plug is disposed in the end piece of the housing. A gas conduit leads to an ignition head in the housing and an air feed line is provided to the interior of the housing.

A device of this kind has been disclosed by Published, Non-Prosecuted German Patent Application DE 43 20 429 A1. In this document, the gas conduit serving as an ignition conductor is in direct contact with the ignition air. This must therefore be absolutely dry and free from oil, but this is generally difficult to achieve. The insulation is effected in part by use of ceramic pins which break easily under stress, e.g. during assembly, or in the event of pulsation during operation, leading to spark-overs in the device, which is also referred to as an ignition torch.

SUMMARY OF THE INVENTION

It is accordingly an object of the invention to provide a device for igniting a combustion in a combustion chamber of a gas turbine that overcomes the above-mentioned disadvantages of the prior art devices of this general type, which avoids contact between the ignition conductor and the ignition air and failure due to damage from the ceramic material, and improves the quality of the overall ignition.

With the foregoing and other objects in view there is provided, in accordance with the invention, a device for igniting a combustion in a combustion chamber of a gas turbine, including:

a housing having an end piece, a head piece and an interior formed therein;

an ignition conductor extending between the end piece and the head piece;

a spark plug disposed in the end piece;

an ignition head disposed in the housing;

a gas conduit leading to the ignition head, the ignition conductor and the gas conduit running parallel to one another within the housing;

an air feed line leading to the interior of the housing;

a protective sleeve surrounding the ignition conductor and forming an annular space between the ignition conductor and the protective sleeve, the protective sleeve having an end projecting into the head piece;

a ceramic material filling the annular space and fixed relative to at least one of the ignition conductor and the protective sleeve; and an annular disc serving as an ignition electrode mounted on the end of the protective sleeve projecting into the head piece.

Accordingly, the ignition conductor and the gas conduit run parallel to one another within the housing. The ignition conductor is surrounded by the protective sleeve. The annular space between the ignition conductor and the protective sleeve is filled with a ceramic material that is fixed relative to the ignition conductor and/or the protective sleeve. An annular disc serving as an ignition electrode is mounted on that end of the protective sleeve that projects into the head piece.

The ignition conductor is thus completely encased by the ceramic material and is, for example, fixed by adhesive bonding. If the ceramic material breaks, this does not impair functionality. Fragments of the ceramic material cannot fall into the combustion chamber since the disc serving as an ignition electrode prevents this. The ignition conductor is completely insulated from the ignition air and the ignition air therefore has to meet lower quality requirements, something that contributes to an additional reduction in costs in the preparation of the ignition air.

The gas conduit and the protective sleeve have a plurality of spacers configured as sliding discs. At least some of the sliding discs are connected rigidly to the gas conduit and/or the protective sleeve. The protective sleeve is likewise connected rigidly to the ignition head, while the ignition head is configured in such a way as to be displaceable relative to the head piece.

Since the rigid connection between the internal components of the device is achieved by welding or brazing, they cannot become detached due to vibration. The relevant components are configured in such a way that relative displacement is possible to allow compensation for thermal expansion.

Placing a thermocouple in the interior of the head piece results in that it is always possible to detect the ignition flame immediately. This measure also makes it possible to monitor the failure of an ignition torch.

In accordance with a feature of the invention, the spark plug has a pick-up, and the ignition conductor has an end facing towards the spark plug and projects into the pick-up of the spark plug and the ignition conductor can be moved in an axial direction relative to the pick-up.

Other features which are considered as characteristic for the invention are set forth in the appended claims.

Although the invention is illustrated and described herein as embodied in a device for igniting a combustion in a combustion chamber of a gas turbine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic sectional view of a device for igniting a combustion in a combustion chamber of a gas turbine; and FIG. 2 is a front-elevational view of a sliding disc.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a device 1, which is also referred to as an ignition torch, that is formed of a housing 2, which is closed off by an end piece 3. At its end remote from the end piece 3, the housing 2 has a head piece 4. Extending from a spark plug 5 welded into the end piece 3 is a pick-up 6, into which there projects an ignition conductor 7. The ignition conductor 7 can be moved in an axial direction relative to the pick-up 6. Extending from the end piece 3 to an ignition head 8, concentrically with respect to the ignition conductor 7, is a protective sleeve 9, which is welded or soldered relative to the ignition head 8. An annular space 10 thus formed between the ignition conductor 7 and the protective sleeve 9 is filled with a ceramic material 20. The ceramic filling 20 is connected to the ignition conductor 7 and/or the protective sleeve 9 by adhesive bonding. Together with the ignition conductor 7, an annular disc 11 which delimits the annular space 10 in the region of the head piece 4 serves as an ignition electrode. The disc 11 additionally prevents the loss of ceramic fragments in the direction of a non-illustrated combustion chamber.

A gas conduit 12, which ends in the ignition head 8, runs through the housing 2, parallel to the protective sleeve 9. A gas is fed in via a hole 13 formed in the end piece 3. Combustion air is fed in via an opening 14 provided in the housing 2 and is kept away from the ignition conductor 7 by the protective sleeve 9.

A plurality of spacers configured as sliding discs 15 are connected to the gas conduit 12 by brazing or welding. The sliding disc 15 disposed next to the ignition head 8 is welded to the protective sleeve 9, while the remaining sliding discs 15 are not connected in any way to the protective sleeve 9 to allow compensation of thermal expansion. FIG. 2 shows a front view of the sliding disc 15. Sealing between the ignition head 8 and the head piece 4 is effected by use of toroidal sealing rings 16 which allow relative motion. There is a clearance between the outer circumferential surface of the sliding discs 15 and the inner circumferential surface of the housing 2, this likewise being intended to permit relative motion in the longitudinal direction.

Finally, a thermocouple 17 projects by a specifiable amount into the interior of the head piece 4.

We claim:

1. A device for igniting a combustion in a combustion chamber of a gas turbine, comprising:
    a housing having an end piece, a head piece and an interior formed therein;
    an ignition conductor extending between said end piece and said head piece;
    a spark plug disposed in said end piece;
    an ignition head disposed in said housing;
    a gas conduit leading to said ignition head, said ignition conductor and said gas conduit running parallel to one another within said housing;
    an air feed line leading to said interior of said housing;
    a protective sleeve surrounding said ignition conductor and forming an annular space between said ignition conductor and said protective sleeve, said protective sleeve having an end projecting into said head piece;
    a ceramic material filling said annular space and fixed relative to at least one of said ignition conductor and said protective sleeve; and
    an annular disc serving as an ignition electrode mounted on said end of said protective sleeve projecting into said head piece.

2. The device according to claim 1, wherein said ceramic material is bonded adhesively to at least one of said ignition conductor and said protective sleeve.

3. The device according to claim 1, including a plurality of spacers configured as sliding discs supporting said gas conduit and said protective sleeve, at least some of said sliding discs are connected rigidly to at least one of said gas conduit and said protective sleeve, said protective sleeve is connected rigidly to said ignition head, and said ignition head is configured to be displaceable relative to said head piece.

4. The device according to claim 1, wherein said spark plug has a pick-up, and said ignition conductor has an end facing toward said spark plug and projects into said pick-up of said spark plug and said ignition conductor can be moved in an axial direction relative to said pick-up.

5. The device according to claim 1, including a thermocouple projecting by a specifiable amount into said interior of said head piece.

* * * * *